United States Patent
Subramaniyam et al.

(10) Patent No.: US 10,316,203 B2
(45) Date of Patent: Jun. 11, 2019

(54) ADHESION PROMOTING SYSTEM, AND INK COMPOSITIONS THEREOF

(71) Applicant: Dorf Ketal Chemicals (India) Private Limited, Mumbai (IN)

(72) Inventors: Mahesh Subramaniyam, Mumbai (IN); Michael Michalczyk, Houston, TX (US)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 175 days.

(21) Appl. No.: 15/325,372

(22) PCT Filed: Jul. 9, 2015

(86) PCT No.: PCT/IB2015/055207
§ 371 (c)(1),
(2) Date: Jan. 10, 2017

(87) PCT Pub. No.: WO2016/005940
PCT Pub. Date: Jan. 14, 2016

(65) Prior Publication Data
US 2017/0183517 A1    Jun. 29, 2017

(30) Foreign Application Priority Data
Jul. 11, 2014   (IN) .................. 2282/MUM/2014

(51) Int. Cl.
C09D 11/00    (2014.01)
C09J 11/00    (2006.01)

(52) U.S. Cl.
CPC .............. C09D 11/00 (2013.01); C09J 11/00 (2013.01)

(58) Field of Classification Search
None
See application file for complete search history.

(56) References Cited

U.S. PATENT DOCUMENTS

| | | | |
|---|---|---|---|
| 4,659,848 A | 4/1987 | Kay et al. | |
| 4,705,568 A | 11/1987 | Kay et al. | |
| 5,594,044 A * | 1/1997 | Yang .................. | C09D 11/36 106/31.05 |
| 5,825,391 A * | 10/1998 | Yang .................. | C09D 11/36 347/106 |
| 6,150,430 A * | 11/2000 | Walters ............... | C09D 4/00 348/902 |
| 2010/0010144 A1* | 1/2010 | Duncan .............. | C09D 11/03 524/500 |
| 2011/0254909 A1* | 10/2011 | Lu ....................... | B41M 5/00 347/102 |
| 2012/0282447 A1* | 11/2012 | Gringoire ............ | C08J 7/045 428/216 |

FOREIGN PATENT DOCUMENTS

| | | |
|---|---|---|
| EP | 0730014 A1 | 9/1996 |
| IN | 2282/MUM/2014 | 7/2014 |
| WO | 03062339 A2 | 7/2003 |
| WO | 2007019078 A2 | 2/2007 |
| WO | WO 2007/119078 A1 * | 10/2007 |
| WO | 2016005940 A1 | 1/2016 |

OTHER PUBLICATIONS

FC-4432 Safety Data Sheet from 3M, May 2015; 13 pages.*
Surfynol 465 Safety Data Sheet from Air Products, Nov. 2005; 6 pages.*
Surfynol 420 Safety Data Sheet from Air Products, Jun. 2013; 7 pages.*
Surfynol 440 Safety Data Sheet1 from Chen Service Inc., Sep. 2013; 3 pages.*
Surfynol 440 Safety Data Sheet2 from Air Products, Nov. 2014; 9 pages.*
Dynol 604 Safety Data Sheet from Air Products, Mar. 2016; 17 pages.*
Envirogem 360 Product Sheet from ECHA, Nov. 2018; 3 pages.*
Foreign communication from a related counterpart application—International Search Report and Written Opinion, PCT/IB2015/055207, dated Sep. 7, 2015, 9 pages.

* cited by examiner

*Primary Examiner* — Helene Klemanski
(74) *Attorney, Agent, or Firm* — Conley Rose, P.C.; Rodney B. Carroll

(57) ABSTRACT

The present invention relates to adhesion promoting composition comprising:
(a) an organotitanate adhesion promoter; and
(b) at least one surface active agent; and
(c) optionally comprises at least one solvent;
wherein the surface active agent comprises a compound selected from the group comprising a surfactant and a polymeric surfactant;
wherein the adhesion promoting composition imparts adhesion on a polymer film even if:
(i) quality of the film substrate has degraded,
(ii) the film substrate has inconsistent surface treatments across the films.

In second aspect, the present invention relates to ink compositions comprising the adhesion promoting composition.

In third aspect, the present invention relates to a method for improving the adhesion of an ink composition to a substrate, wherein the ink composition comprises adhesion promoting composition.

In fourth aspect, the present invention relates to a substrate having improved adhesion of an ink composition, wherein the ink composition comprises adhesion promoting composition.

8 Claims, No Drawings

ADHESION PROMOTING SYSTEM, AND INK COMPOSITIONS THEREOF

CROSS-REFERENCE TO RELATED APPLICATIONS

This application is a filing under 35 U.S.C. 371 of International Application No. PCT/IB2015/055207 filed Jul. 9, 2015, entitled "Adhesion Promoting System, and Ink Compositions Thereof," which claims priority to Indian Patent Application No. 2282/MUM/2014 filed Jul. 11, 2014, which applications are incorporated by reference herein in their entirety.

FIELD OF THE INVENTION

The present invention primarily relates to:
a) adhesion promoters for inks, particularly for packaging inks;
b) ink compositions comprising adhesion promoters of the present invention;
c) a method for improving the adhesion of an ink to a substrate, preferably to a polymer substrate; and
d) a polymer substrate having improved adhesion of an ink.

BACKGROUND OF THE INVENTION

Adhesion promoting compounds are used in commercial ink formulations for packing inks in order to enhance the adhesion between the ink and the substrate onto which the ink is printed. Failure of adhesion leads to difficulties in the printing process or adhesion failures resulting in removal of the printed ink. Printing of food packaging on polymeric films is widespread and it is particularly important in such applications that the printed ink remains on the packaging and that parts of the ink composition do not contaminate the product packed in the packaging. Polymer films such as polypropylene (PP) and polyester (PE) need to be surface treated to provide the required adhesion of the ink to the film. The surface energy of a packaging film, expressed in the units dynes/cm, is a critical film property when printing, coating or laminating packaging films.

For PP films, the surface energy must be between 36-42 dynes/cm to achieve good adhesion, and for PE films, the surface energy must be above 52 dynes/cm to achieve good adhesion. If the surface energy goes down these range/values, then the adhesion promoters of the known art do not provide good adhesion.

Furthermore, the PP surface treated films tend to loose surface energy (surface charge) particularly when the film is surface treated by Corona to 38 dynes/cm, which further reduces to less than 36 dynes/cm. Therefore, use of PP films (and similarly of PE films) has substantial economic disadvantage, because the film has to be retreated again.

Adhesion promoters based upon titanium compounds have been known and used commercially for many years in solvent-borne packaging inks.

The common adhesion promoters used are
i) titanium acetylacetonates; and
ii) titanium alkyl phosphates.
i) The titanium acetylacetonates provide good adhesion between the ink and a treated film substrate. However, they tend to impart a) undesirable yellow color and b) undesirable odor to the ink. Furthermore, the titanium acetylacetonates c) are not recommended for use in the inks for food packaging due to toxicity issues of acetyl acetone.

ii) The U.S. Pat. Nos. 4,659,848 and 4,705,568 describe titanium phosphate adhesion promoters, which consists of a reaction product of a titanium orthoester and an alkyl phosphate. Such promoters provide efficient adhesion promotion with much less yellowing and odor than the aforementioned titanium acetylacetonates and can be used on food packaging. However, even these promoters do not provide good adhesion on low surface treated films. The adhesion promoter, Tyzor® IAM, is available from as available from Dorf Ketal Speciality Catalysts, or Dorf Ketal Chemicals (India) Private Limited in the comparative examples are in this family of adhesion promoters. The adhesion promoters described in Example 1 and 2 are in this family of adhesion promoters.

Recently there has been a degradation of the quality of the film substrates used in flexible packaging, which results in inconsistent surface treatments across the films, particularly when the film is treated by corona discharge surfaced treatment to create reactive groups for the adhesion promoters. For example, the PP films can have areas of the film with the surface energy equal to or less than about 36 dynes/cm, and the PE films may have areas with the surface energy equal to or less than about 52 dynes/cm, which has been found to be responsible for causing poor adhesion of the ink to the polymer films. This in turn creates a performance gap which must be overcome.

NEED OF THE INVENTION

Therefore, there is a need of adhesion promoters or adhesion promoting systems or adhesion promoting compositions, which can overcome one or more of the above-discussed problems and limitations of the adhesion promoters and the printing inks used in the packaging industry.

Particularly, there is a need of (a) adhesion promoters or adhesion promoting systems or adhesion promoting compositions for the printing inks; and (b) the printing inks comprising the said adhesion promoters or adhesion promoting systems or adhesion promoting compositions, which can overcome one or more of the above-discussed problems and limitations of the adhesion promoters and the printing inks used in the packaging industry.

More particularly, there is a need of (a) adhesion promoters or adhesion promoting systems or adhesion promoting compositions for the printing inks; and (b) the printing ink compositions comprising said adhesion promoters or adhesion promoting systems or adhesion promoting compositions, which can overcome one or more of the above-discussed problems and limitations of the adhesion promoters and the printing inks used in the packaging industry, particularly when the quality of the film substrates used in flexible packaging has degraded, the film substrate has inconsistent surface treatments across the films, and/or the film substrate has areas wherein surface energy is even equal to or less than about 36 dynes/cm when it is made of PP film, or equal to or less than about 52 dynes/cm when it is made of PE film, which (with the known adhesion promoters) have been found to be responsible for causing poor adhesion of the ink composition to the film substrate, and has, therefore, been found responsible of creating a performance gap.

OBJECTS OF THE INVENTION

The present invention aims at providing adhesion promoters, which may also be referred to as adhesion promoting systems or adhesion promoting compositions, for the packaging inks which can provide good adhesion to polymer packaging films even if those films have a) lower then optimal surface energy, and b) inconsistent surface energy, i.e. has surface energy of equal to or less than 36 dynes/cm when it is made of PP film, or equal to or less than 52 dynes/cm when it is made of PE film, wherein the known adhesion promoters described herein do not work.

The present invention also aims at providing adhesion promoting systems, or adhesion promoting compositions that can be used in food packaging.

Accordingly, the object of the present invention is to provide adhesion promoting compositions, which can overcome one or more of the above-discussed problems and limitations of the adhesion promoters and the printing inks used in the packaging industry.

Accordingly, the another object of the present invention is to provide (a) adhesion promoting compositions for the printing inks; and (b) the printing inks comprising the said adhesion promoting compositions, which can overcome one or more of the above-discussed problems and limitations of the adhesion promoters and the printing inks used in the packaging industry.

Accordingly, the main object of the present invention is to provide (a) adhesion promoting compositions for the printing inks, which have been found to be suitable for use in printing ink formulations for promoting the adhesion of the printing ink to polymer substrates even if that polymer substrate has got:
(i) inconsistent surface treatments;
(ii) less than the optimal surface energy, and/or
(iii) wherein it has been found that the known adhesion promoters do not successfully work.

For example, for the PP films, the present invention provides an adhesion promoter composition which gives good adhesions even if the polymer substrate has surface energy of equal to or less than about 36 dynes/cm, and for the PE films, the present invention provides an adhesion promoter composition which gives good adhesions even if the polymer substrate has surface energy of equal to or less than about 52 dynes/cm.

Accordingly, still another object of the present invention is to provide (b) the printing inks comprising the adhesion promoting compositions of the present invention.

In one of the embodiments, yet another object of the present invention is to provide:
(a) adhesion promoting compositions for the printing inks; and
(b) the printing ink compositions comprising said adhesion promoting compositions,
wherein the adhesion promoting compositions of the present invention overcome the above-discussed problems and limitations of the adhesion promoters and the printing inks used in the packaging industry, particularly when
(i) the quality of the film substrates used in flexible packaging has degraded, and
(ii) the film substrate has inconsistent surface treatments across the films, and
(iii) the film substrate has areas wherein surface energy is even equal to or less than about 36 dynes/cm when it is made from PP film, or equal to or less than about 52 dynes/cm when it is made from PE film, which (with the known adhesion promoters) has been found to be responsible for causing poor adhesion of the ink composition to the film substrate, and has, therefore, been found responsible of creating a performance gap.

It is also an object of the present invention to overcome or alleviate at least one of the above noted drawbacks of related art systems or to at least provide a useful alternative to the related art systems.

Other objects and advantages of present invention will become more apparent from the following description when read in conjunction with examples, which are not intended to limit scope of present invention.

DETAILED DESCRIPTION OF THE INVENTION

With aim to overcome one or more of the above-discussed problems or limitations of the prior art, the inventors have found that when (a) an organotitanate adhesion promoter is combined with (b) one or more of surface active agents, the resulting adhesion promoting composition, surprisingly and unexpectedly, results in good or improved or enhanced adhesion on a polymer film even if the:
(i) quality of the film substrate has degraded,
(ii) film substrate has inconsistent surface treatments across the films, and
(iii) film substrate has areas wherein surface energy is even equal to or less than about 36 dynes/cm when it is made from PP film, or equal to or less than about 52 dynes/cm when it is made from PE film.

Therefore, in accordance with first embodiment of the present invention, it relates to adhesion promoting composition comprising:
(a) an organotitanate adhesion promoter; and
(b) at least one surface active agent, and
(c) optionally comprises at least one solvent,
wherein the surface active agent comprises a compound selected from the group comprising a surfactant and a polymeric surfactant; and
wherein the adhesion promoting composition has been, surprisingly and unexpectedly, found suitable to impart adhesion on a polymer film even if:
(i) quality of the film substrate has degraded,
(ii) the film substrate has inconsistent surface treatments across the films.

In accordance with one of the embodiments of the present invention, the surface active agent is capable of reducing surface energy (surface tension) of an ink composition comprising the present adhesion promoting composition.

In accordance with one of the embodiments of the present invention, the film substrate has areas wherein surface energy is even equal to or less than about 36 dynes/cm when it is made from polypropylene (PP) film, or equal to or less than about 52 dynes/cm when it is made from polyester (PE) film.

In accordance with second embodiment of the present invention, it relates to ink compositions comprising adhesion promoting composition, wherein the adhesion promoting composition comprises:
(a) an organotitanate adhesion promoter; and
(b) at least one surface active agent; and
(c) optionally comprises at least one solvent,
wherein the surface active agent comprises a compound selected from the group comprising a surfactant and a polymeric surfactant; and
wherein the ink composition has been, surprisingly and unexpectedly, found suitable to have adhesion on a polymer film even if:
(i) quality of the film substrate has degraded,
(ii) the film substrate has inconsistent surface treatments across the films.

In accordance with one of the embodiments of the present invention, the surface active agent is capable of reducing surface energy (surface tension) of the ink composition comprising the present adhesion promoting composition.

In accordance with one of the embodiments of the present invention, the film substrate has areas wherein surface energy is even equal to or less than about 36 dynes/cm when it is made from polypropylene (PP) film, or equal to or less than about 52 dynes/cm when it is made from polyester (PE) film.

In accordance with third embodiment of the present invention, it relates to a method for improving adhesion of an ink composition to a substrate, wherein the ink composition comprises an adhesion promoting composition, and wherein the adhesion promoting composition comprises:
  (a) an organotitanate adhesion promoter; and
  (b) at least one surface active agent; and
  (c) optionally comprises at least one solvent,
wherein the surface active agent comprises a compound selected from the group comprising a surfactant and a polymeric surfactant; and
wherein the ink composition has been, surprisingly and unexpectedly, found suitable to have adhesion on the substrate even if:
  (i) quality of the substrate has degraded,
  (ii) the substrate has inconsistent surface treatments.

In accordance with one of the embodiments of the present invention, the substrate is a polymer substrate.

In accordance with one of the embodiments of the present invention, the surface active agent is capable of reducing surface energy (surface tension) of the ink composition comprising the present adhesion promoting composition.

In accordance with one of the embodiments of the present invention, the film substrate has areas wherein surface energy is even equal to or less than about 36 dynes/cm when it is made from polypropylene (PP) film, or equal to or less than about 52 dynes/cm when it is made from polyester (PE) film.

In accordance with fourth embodiment of the present invention, it relates to a substrate, preferably a polymer substrate having improved adhesion of an ink composition, wherein the ink composition comprises adhesion promoting composition, and wherein the adhesion promoting composition comprises:
  (a) an organotitanate adhesion promoter; and
  (b) at least one surface active agent, and
  (c) optionally comprises at least one solvent,
wherein the surface active agent comprises a compound selected from the group comprising a surfactant and a polymeric surfactant; and
wherein the substrate has been, surprisingly and unexpectedly, found to have adhesion of the ink composition even if:
  (i) quality of the substrate (substrate film) has degraded,
  (ii) the substrate has inconsistent or low surface treatments.

In accordance with one of the embodiments of the present invention, the surface active agent is capable of reducing surface energy (surface tension) of the ink composition comprising the present adhesion promoting composition.

In accordance with one of the embodiments of the present invention, the film substrate has areas wherein surface energy is even equal to or less than about 36 dynes/cm when it is made from polypropylene (PP) film, or equal to or less than about 52 dynes/cm when it is made from polyester (PE) film.

It may be noted that as per the present invention, the polymer substrate may be surface treated by any conventional or known method. The scope of the present invention is not restricted by the method of surface treatment of the substrate. The feature relevant for the present invention is that the polymer substrate has low surface treatment, and has low and/or inconsistent surface energy.

In accordance with one of the embodiments, the presently provided adhesion promoting composition is capable of providing good adhesion to surface treated polypropylene (PP) films even if these films have surface energy less than about 36 dynes/cm (generally it is between 36-42 dynes/cm), preferably varying from more than about 30 to less than about 36 dynes/cm, more preferably varying from about 33 to less than about 36 dynes/cm.

In accordance with one of the embodiments, the presently provided adhesion promoting composition is also capable of providing good adhesion to surface treated polyester (PE) films even if these films have surface energy less than about 52 dynes/cm (generally it is greater than about 52 dynes/cm), preferably varying from more than about 48 to less than about 52 dynes/cm, more preferably varying from about 50 to less than about 52 dynes/cm.

As an exemplary embodiment, the polymer substrate used in packaging inks is surface treated typically by corona discharge to create reactive hydroxyl and carboxyl groups for the titanate adhesion promoters to react with. The amount of surface treatment is measured and expressed by the surface energy of the film. There is an optimal level needed to use for standard adhesion promoters known in the prior art.

For the surface treated polypropylene (PP) films, the surface energy varies between 36-42 dynes/cm.

The untreated PP films will have surface energy of about 30 dynes/cm.

For the surface treated polyester (PE) films, the surface energy is greater than 52 dynes/cm.

The untreated PE films will have surface energy of about 46-48 dynes/cm.

If the surface energy of the substrate (or may be referred to as substrate film, or as polymer substrate, or as polymer film) is below the optimal level, adhesion will be poor with the known adhesion promoters. This is an unmet need in the marketplace. The present invention, surprisingly and unexpectedly, provides the good adhesion to the substrate that do not have above-said optimal level of surface energy.

In accordance with one of the embodiments of the present invention, the adhesion promoters of the present invention may be made by mixing the organotitanate, the surface active agent and the optional solvent in any order before adding to the ink. Alternatively, the organotitanate, the surface active agent and the optional solvent can be added as separate components to the ink and then mixed.

In accordance with one of the embodiments of the present invention, the organotitanate adhesion promoter of the present composition is a compound selected from the groups comprising:
  1. organotitanium beta-diketonates comprising a reaction product of a titanium orthoesters and a beta-diketone;
  2. organotitanium alkyl phosphates comprising a reaction product of a titanium orthoester and at least a monoalkyl phosphate;
  3. organotitanium alkyl sulfonates comprising a reaction product of a titanium orthoester and a sulfonic acid or a derivative of sulfonic acid;
  4. reaction product composition of titanium orthoesters, alkyl phosphates and resins; and wherein the titanium orthoesters, the sulphonic acid or the derivative of the sulphonic acid and the resin may be selected from the one described in WO2007/119078, a reference to which is drawn here in totality.

In accordance with one of the embodiments of the present invention, the organotitanium beta-diketonates comprise a reaction product of a titanium orthoesters and a beta-diketone, for example acetylacetone.

In accordance with one of the embodiments of the present invention, the organotitanium alkyl phosphates comprise a reaction product of a titanium orthoester and at least a monoalkyl phosphate, for example a mixture of a monoalkyl phosphate and a dialkyl phosphate.

In accordance with one of the preferred embodiments of the present invention, the organotitanium adhesion promoter may be selected from the group comprising Tyzor® AA-65, Tyzor® AA-75 and Tyzor® IAM as available from Dorf Ketal Speciality Catalysts.

In accordance with one of the preferred embodiments of the present invention, the surface active agent of the present composition comprises a compound selected from the group comprising a surfactant, a polymeric surfactant, which is capable of reducing the surface energy of the solvent-based ink below the lowest surface energy of the inconstantly treated polymer films.

In accordance with one of the preferred embodiments of the present invention, the surface active agent of the present composition is capable of reducing the surface energy of the solvent-based ink to less than 36 dynes/cm for the PP film, or less than 52 dynes/cm for the PE film to allow the ink to achieve good adhesion to the PP or the PE film if the film has areas that contain less than the optimal surface energies.

In accordance with the present invention, the surface active agents of the present composition are not too soluble in the ink medium.

In accordance with one of the preferred embodiments of the present invention, the surface active agent is selected from the group comprising Novec™ Fluorsurfactants FC4430 and FC4432 from 3M, Surfynol® 420, 440 and 465, Dynor™ 604 and Envirogem® 360 surfactants from Air Products.

In accordance with one of the embodiments of the present invention, the Surfynol® surface active agents are preferred as these have advantage that these can be used under certain limitations in food contact applications.

In accordance with one of the preferred embodiments of the present invention, the solvents are generally selected from the group comprising alkyl alcohols, esters known in the art to be used in ink formulations.

In accordance with one of the preferred embodiments of the present invention, the solvent is selected from the group comprising ethanol, 1-propanol, 2-propanol, ethyl acetate and n-propyl acetate.

The adhesion promoting composition of the present invention has been found to be of particular use in flexographic and gravure inks containing a polymeric binder, typically nitrocellulose, which is cross-linkable and which is dissolved in an appropriate organic solvent. The packaging inks of the invention are also typically of this type.

In accordance with one of the embodiments of the present invention, the binders used in the packaging inks are those based on nitrocellulose or ester type modified cellulose, e.g. cellulose acetate propionate. Often such polymeric binders are employed in mixed form with polyamides, polyurethanes or other resins.

In accordance with one of the embodiments of the present invention, the ink compositions of the present invention optionally comprises additional component selected from the group comprising at least one pigment and at least one dye.

In accordance with one of the embodiments of the present invention, the pigments which can be used are colored inorganic pigments, white inorganic pigments, colored organic pigments and colored dyes. The printing ink used with the adhesion promotion systems of the present invention need not necessarily include a pigment and/or a dye. Where no pigment or dye is present, the ink composition is often referred to as a varnish.

In accordance with one of the embodiments of the present invention, the ink compositions of the present invention may also contain other additives such as slip aids and plasticizers.

The ink compositions of the present invention may usually contain the adhesion promoting composition of the present invention in an amount of up to about 10% by weight of the total weight of ink, and preferably in an amount of about 1 to about 6% by weight of the ink composition.

The adhesion promoting compositions of the present invention are particularly effective on substrates that contain low surface energy treatments. On metal and polymer substrates containing high surface energies, greater than 36 dynes/cm, they are particularly effective and they may, therefore, be employed at lower concentrations than known adhesion promoters. Therefore in some applications the adhesion promoting compositions of the present invention may be added to the ink composition in an amount of about 1 to about 3% of the total weight of the ink composition. When the adhesion promoter is used in a masterbatch composition, the concentration may be much greater, e.g. up to about 20% by weight, but this may be diluted with other components of the ink composition before printing.

The ink compositions of the present invention may provide improved stability to increase in viscosity of the inks, particularly if they are used with the resin-stabilized organotitanium adhesion promoters described earlier in this invention.

The ink compositions of the present invention are of particular use in printing substrates formed of polymeric materials, especially films, such as those used in packaging, especially food packaging. Examples of such substrates include polyester, polypropylene, polyethylene or co-extruded polypropylene/polyethylene film or sheets and polyvinylidene dichloride coated plastics material but this list is not intended to be limiting.

The present invention is now described with the help of following examples, which are not intended to limit scope of the present invention, but have been incorporated to illustrate mode and best mode of performing the present invention.

EXAMPLES

Ink Adhesion Test

The adhesion promoter of the present invention and the prior art to be tested was added to a Magenta color ink base supplied by Hitech Inks, Vapi, India and mixed for about 5 minutes using a magnetic stirrer. Biaxially oriented polypropylene (BOPP) film, approximately about 10 microns average thickness, was corona-discharge-treated to provide an average surface energy of about 33 dynes/cm. Ink draw downs were done on a K-Coater Applicator using a number 2 K-bar. Films were dried using a hair dryer for about 32-35 seconds and then a tape adhesion test was performed using cellophane tape. Results were determined by the percentage ink remaining in the test area after removal of the adhesive tape after 0 hours (Instant), 2 hours, 15 hours and 24 hours. The three inks to be compared were applied side-by-side to the same substrate film and a single strip of the cellophane tape was placed over all the print samples together to ensure that the test conditions are identical. The inks were tested two more times with each ink occupying the left, center and right positions in the drawdown, and the amount of ink remaining was measured and averaged and expressed as a % retention on the film. The amount of ink remaining on the substrate is expressed as a percentage of the ink before the test.

Example 1 (Comparative Example)

In a 1 liter flask dried and purged with nitrogen gas, 377.1 g of tetra(isopropyl)titanate (Tyzor® TPT supplied by Dorf Ketal Speciality Catalysts) was charged, then stirred and heated to about 40° C. 112.2 g of 2-propanol was added followed by 174.5 g of denatured ethanol. A mild exotherm up to about 5° C. was observed. The stirred solution was kept below about 50° C. 86.2 g of butyl acid phosphate (Hordaphos MDB obtained from Clariant) was added, and the stirred mixture was held between about 20 to about 40° C. for a minimum of about 3 hours, and then cooled to room temperature yielding a clear solution with a titanium content of about 8.69%.

Example 2 (Comparative Example)

In a 1 liter flask dried and purged with nitrogen gas, 503 g of tetra(isopropyl)titanate (Tyzor® TPT supplied by Dorf Ketal Speciality Catalysts) was charged, then stirred and heated to about 40° C. 246 g of 2-propanol was added followed by 103 g of denatured ethanol. A mild exotherm was observed. The stirred solution was kept below about 50° C. Then 82 g of butyl acid phosphate (Hordaphos MDB obtained from Clariant) was added, and the stirred mixture was held between about 20 to about 40° C. for a minimum of about 3 hours, and then cooled to room temperature yielding a clear solution with a titanium content of about 8.8%.

Example 3 (Comparative Example)

The adhesion promoter Tyzor® IAM was employed, and an ink was made up using the same test ink formulation as described above. Adhesion was tested and the % retention of the film on the substrate is recorded in Table 1.

Example 4 (Comparative Example)

The adhesion promoter—Tyzor® IAM was used, and an ink was made up using the same test ink formulation as described above, however, this time Capstone® FS-3100 fluorosurfactant, as obtained from the DuPont Company, was also added. The Capstone® FS-3100 has good solubility in the ink solvent system, so it behaves as a solute instead of a surface active agent.

Adhesion was tested, and it was found that the adhesion promoter—Tyzor® IAM, and adhesion promoter of Example 1 gave no adhesion and zero retention of the film. The adhesion promoter of Example 2 showed adhesion only with 63% of the film adhering to the BOPP substrate, but after 24 hours. The combination (composition) of Tyzor® IAM/Capstone® FS-3100 gave no adhesion to the BOPP substrate.

TABLE 1

| Adhesion Promoter | Weight % of Adhesion Promoter | Surface active Agent | Weight % of Surface active Agent | % of Retention of Film | | | |
|---|---|---|---|---|---|---|---|
| | | | | Instant | 2 hours | 15 hours | 24 hours |
| Of Example 1 | 2 | None | 0 | 0 | 0 | 0 | 0 |
| Of Example 2 | 4 | None | 0 | | | 3 | 63 |
| Tyzor ® IAM | 2 | None | 0 | 0 | 0 | 0 | 0 |
| Tyzor ® IAM + Capstone ® FS-3100 | 2:1 | None | 0 | 0 | 0 | 0 | |

Example 5 (Adhesion Promoter of the Prior Art for the Composition of the Present Invention)

In a 1 liter flask dried and purged with nitrogen gas, 500 g of tetra(isopropyl)titanate (Tyzor® TPT supplied by Dorf Ketal Speciality Catalysts) was charged, then stirred and heated to about 40° C. 125 g of dodecylbenzene sulfonic acid (DDBSA) was added followed by denatured ethanol to adjust the titanium content to around 8.5%. A mild exotherm was observed. The stirred solution was kept below about 50° C. and then cooled to room temperature yielding a clear solution.

Example 6 (Adhesion Promoter of the Prior Art for the Composition of the Present Invention)

In a 1 liter flask dried and purged with nitrogen gas, 503 g of tetra(isopropyl)titanate (Tyzor® TPT supplied by Dorf Ketal Speciality Catalysts) was charged, then stirred and heated to about 40° C. 175 g of dodecylbenzene sulfonic acid (DDBSA) was added followed by denatured ethanol to adjust the titanium content to around 8.5%. A mild exotherm was observed. The stirred solution was kept below about 50° C. and then cooled to room temperature yielding a clear solution.

Example 7 (Invention Compositions/Invention Examples)

An ink was made up using the same test ink formulation as described above, but this time the surface active agent of the present invention was also added, and the resulted composition provided surface activity in the ink solvent systems. Adhesion was tested and the % retention of the film on the substrate is recorded in Tables 2A and 2B. The adhesion is, surprisingly and unexpectedly, substantially improved by combining the adhesion promoters of the prior art with the surface active agent of the present invention resulting in the adhesion promoting composition of the present invention.

TABLE 2A

| Adhesion Promoter | Weight % of Adhesion Promoter | Surface active Agent | Weight % of Surface active Agent | % of Retention of Film | | | |
|---|---|---|---|---|---|---|---|
| | | | | Instant | 2 hours | 15 hours | 24 hours |
| Of Example 1 | 2 | FC-4432 ® | 1 | | 95 | | |
| Of Example 1 | 2 | FC-4432 ® | 0.5 | | 70 | 85 | 95 |
| Of Example 1 | 3 | FC-4432 ® | 0.2 | | 10 | 90 | 90 |
| Of Example 1 | 4 | FC-4432 ® | 0.1 | | 60 | | 95 |
| Of Example 2 | 4 | FC-4432 ® | 0.05 | | | 77 | 85 |
| Of Example 2 | 4 | FC-4432 ® | 0.1 | | | 83 | 95 |
| Of Example 2 | 4 | Surfynol 465 ® | 0.1 | 0 | 50 | 75 | 95 |
| Of Example 2 | 4 | Dynol 604 ® | 0.1 | 0 | 15 | — | 95 |
| Of Example 2 | 4 | EnviroGem 360 ® | 0.1 | 0 | 15 | 90 | 95 |
| Tyzor ® IAM (Example 3) | 2 | FC-4432 ® | 1 | 0 | 25 | 80 | |
| Tyzor ® IAM (Example 3) | 4 | FC-4432 ® | 0.1 | | 15 | 85 | 95 |
| Of Example 5 | 4 | FC-4432 ® | 0.1 | | 5 | 15 | 90 |
| Of Example 6 | 4 | FC-4432 ® | 0.1 | | 10 | 50 | 90 |

TABLE 2B

| Adhesion Promoter | Weight % of Adhesion Promoter | Surface active Agent | Weight % of Surface active Agent | % of Retention of Film | | | |
|---|---|---|---|---|---|---|---|
| | | | | Instant | 2 hours | 15 hours | 24 hours |
| Of Example 1 | 2 | None | 0 | 0 | 0 | 0 | 0 |
| Of Example 1 | 2 | None | 0 | 0 | 0 | 0 | 0 |
| Of Example 1 | 3 | None | 0 | | | | |
| Of Example 1 | 4 | None | 0 | | | | |
| Of Example 2 | 4 | None | 0 | 0 | 0 | 3 | 63 |
| Of Example 2 | 4 | None | 0 | 0 | 0 | 3 | 63 |
| Of Example 2 | 4 | None | 0 | 0 | 0 | 3 | 63 |
| Of Example 2 | 4 | None | 0 | 0 | 0 | 3 | 63 |
| Of Example 2 | 4 | None | 0 | | | | |
| Tyzor ® IAM (Example 3) | 2 | None | 0 | 0 | 0 | 0 | 0 |
| Tyzor ® IAM (Example 3) | 4 | None | 0 | 0 | 0 | 0 | 0 |

From the foregoing examples, it may be concluded that:

adhesion promoter of Example 1 gave no adhesion, and gave zero retention of the film;

adhesion promoter—Tyzor® IAM (re Example 3) also gave no adhesion, and gave zero retention of the film;

adhesion promoter—Tyzor® IAM (re Example 4) even on combination with Capstone® FS-3100 fluorosurfactant gave no adhesion to the BOPP substrate, wherein Capstone® FS-3100 has good solubility in the ink solvent system, so it behaves as a solute instead of as a surface active agent;

adhesion promoter—of Example 2 had shown adhesion, but only with 63% of the film adhering to the BOPP substrate, and that's too after 24 hours; and the Invention compositions, Example 7, wherein the surface active agents of the present invention are combined with adhesion promoters of the prior art, i.e. with:

adhesion promoter of Example 1;
adhesion promoter of Example 2;
Tyzor® IAM (re Example 3, not example 4, wherein Capstone® FS-3100 fluorosurfactant was added);
adhesion promoter of Example 5; and
adhesion promoter of Example 6, surprisingly and unexpectedly result in substantial improvement of the adhesion of the adhesion promoters of the prior art.

The combination of adhesion promoter of Example 1 and surface active agent—FC-4432® as available from 3M gave 95% of retention just after 2 hours with 2:1 wt % ratio of adhesion promoter and surface active agent; and gave 85% of retention just after 15 hours and 95% of retention just after 24 hours with 2:0.5 wt % ratio of adhesion promoter and surface active agent; and gave 90% of retention just after 15 hours, which is maintained even after 24 hours with 3:0.2 wt % ratio of adhesion promoter and surface active agent.

The combination of adhesion promoter of Example 2 and surface active agent—FC-4432® as available from 3M gave 85% of retention just after 24 hours with 4:0.05 wt % ratio of adhesion promoter and surface active agent; and gave 83% of retention just after 15 hours and 95% of retention just after 24 hours with 4:0.1 wt % ratio of adhesion promoter and surface active agent.

The combination of adhesion promoter of Example 2 and surface active agent—Surfynol® 465 as available from Air Products gave 95% of retention just after 24 hours with 4:0.1 wt % ratio of adhesion promoter and surface active agent.

The combination of adhesion promoter of Example 2 and surface active agent—Dynor™ 604 as available from Air Products also gave 95% of retention just after 24 hours with 4:0.1 wt % ratio of adhesion promoter and surface active agent.

The combination of adhesion promoter of Example 2 and surface active agent—EnviroGem® 360 surfactants as available from Air Products gave 90% of retention just after 15 hours, and 95% of retention just after 24 hours with 4:0.1 wt % ratio of adhesion promoter and surface active agent.

The combination of adhesion promoter—Tyzor® IAM (re Example 3) and surface active Agent—FC-4432® as available from 3M gave 85% of retention just after 15 hours and 95% of retention just after 24 hours with 4:0.1 wt % ratio of adhesion promoter and surface active agent.

The combination of adhesion promoter of Example 5 and surface active agent—FC-4432® as available from 3M gave 90% of retention just after 24 hours with 4:0.1 wt % ratio of adhesion promoter and surface active agent.

The combination of adhesion promoter of Example 6 and surface active agent—FC-4432® as available from 3M also gave 90% of retention just after 24 hours with 4:0.1 wt % ratio of adhesion promoter and surface active agent.

Therefore, it may also be concluded that the above experimental findings confirm synergistic, surprising and unexpected effects and technical advantages and advancements of the present compositions over the prior art.

Therefore, it may also be concluded that there is substantial increase in efficiency of known adhesion promoters on combining the known adhesion promoters with one or more surface active agents of the present invention.

Therefore, it may also be concluded that the present compositions are capable of achieving substantially higher adhesion even at lower dosages, meaning thereby, the present invention results in economical and environmental benefits.

Therefore, it may also be concluded that the presently provided compositions are superior than the prior art adhesion promoters, and hence, have technical advantages and surprising effects over the prior art.

Therefore, in view of above experimental evidences, the main object and advantage of the present invention has been achieved, i.e., one or more of the above-discussed problems or limitations of the prior art have been overcome by the adhesion promoting compositions of the present invention, wherein an organotitanate adhesion promoter of the prior art is combined with one or more of the surface active agents of the present invention, and the resulted adhesion promoting compositions of the present invention, surprisingly and unexpectedly, have resulted in substantially improved adhesion on a polymer film even if the polymer film has surface energy less than 36 dynes/cm for the PP film, or less than 52 dynes/cm for the PE film.

It may be noted that the compounds defined with the trademark of the suppliers are deemed to have the chemical nature or composition as per supplier's disclosure.

It may be noted that the term 'about' as used herein and in the claims is intended to include experimental errors permissible in the field of the present invention, and is not intended to enlarge scope of the present invention.

The invention claimed is:

1. Ink composition for printing or coating a polymer substrate, wherein the ink composition comprises adhesion promoting composition consisting of:
   (a) an organotitanate adhesion promoter; and
   (b) at least one surface active agent; and
   (c) optionally comprises at least one solvent,
   wherein the surface active agent comprises a compound selected from the group comprising a surfactant and a polymeric surfactant;
   wherein the organotitanate adhesion promoter comprises:
   a. organotitanium beta-diketonates comprising a reaction product of a titanium orthoesters and a beta-diketone;
   b. organotitanium alkyl phosphates comprising a reaction product of a titanium orthoester and at least a monoalkyl phosphate;
   c. organotitanium alkyl sulfonates comprising a reaction product of a titanium orthoester and a sulfonic acid or a derivative of sulfonic acid;
   d. reaction product composition of titanium orthoesters, alkyl phosphates and resins; or
   e. a mixture thereof; and
   wherein the surface active agent is selected from:
   i) a surfactant comprising 2-propenoic acid, 2-[methyl [(nonafluorobutyl)sulfonyl]amino]ethyl ester, 2-methoxymethylethoxypropanol, and polyether polymer;
   ii) ethoxylated 2,4,7,9-tetramethyl-5-decyn-4,7-diol surfactant;
   iii) a surfactant comprising ethoxylated 2,4,7,9-tetramethyl-5-decyne-4,7-diol and 2,4,7,9-tetramethyl-5-decyne-4,7-diol;
   iv) ethoxylated 2,4,7,9-tetramethyl-5-decyn-4,7-diol surfactant or POE (3.5) tetramethyldecynediol surfactant;
   v) 2,5,8,11-tetramethyl-6-dodecyn-5,8-diol ethoxylate surfactant; and
   vi) 2-{[2-hydroxy-3-(octyloxy)propyl]sulfanyl}ethan-1-ol surfactant; and
   wherein the ink composition is capable of adhesion on a polymer substrate even if the polymer substrate has:
   (i) degraded quality;
   (ii) inconsistent surface treatments;
   (iii) areas wherein surface energy is equal to or less than optimal surface energy; and
   (iv) areas wherein surface energy is equal to or less than about 36 dynes/cm when it is made from polypropylene (PP) film, or equal to or less than about 52 dynes/cm when it is made from polyester (PE) film.

2. The ink composition as claimed in claim 1, wherein the composition optionally comprises additional component selected from the group comprising at least one pigment and at least one dye.

3. A method for improving adhesion of an ink composition to a polymer substrate, wherein the ink composition comprises an adhesion promoting composition consisting of:
   (a) an organotitanate adhesion promoter; and
   (b) at least one surface active agent; and
   (c) optionally comprises at least one solvent,
   wherein the surface active agent comprises a compound selected from the group comprising a surfactant and a polymeric surfactant;
   wherein the organotitanate adhesion promoter comprises:
   a. organotitanium beta-diketonates comprising a reaction product of a titanium orthoesters and beta-diketone;
   b. organotitanium alkyl phosphates comprising a reaction product of a titanium orthoester and at least a monoalkyl phosphate;
   c. organotitanium alkyl sulfonates comprising a reaction product of a titanium orthoester and a sulfonic acid or a derivative of sulfonic acid;

d. reaction product composition of titanium orthoesters, alkyl phosphates and resins; or
e. a mixture thereof; and wherein the surface active agent is selected from:
i) a surfactant comprising 2-propenoic acid, 2-[methyl [(nonafluorobutyl)sulfonyl]amino]ethyl ester, 2-methoxymethylethoxypropanol, and polyether polymer;
ii) ethoxylated 2,4,7,9-tetramethyl-5-decyn-4,7-diol surfactant;
iii) a surfactant comprising ethoxylated 2,4,7,9-tetramethyl-5-decyne-4,7-diol and 2,4,7,9-tetramethyl-5-decyne-4,7-diol;
iv) ethoxylated 2,4,7,9-tetramethyl-5-decyn-4,7-diol surfactant or POE (3.5) tetramethyldecynediol surfactant;
v) 2,5,8,11-tetramethyl-6-dodecyn-5,8-diol ethoxylate surfactant; and
vi) 2-{[2-hydroxy-3-(octyloxy)propyl]sulfanyl}ethan-1-ol surfactant; and wherein the polymer substrate has:
(i) degraded quality;
(ii) inconsistent surface treatments;
(iii) areas wherein surface energy is equal to or less than optimal surface energy; and
(iv) areas wherein surface energy is equal to or less than about 36 dynes/cm when it is made from polypropylene (PP) film, or equal to or less than about 52 dynes/cm when it is made from polyester (PE) film.

4. A printed or a coated polymer substrate having improved adhesion of an ink composition comprising;
(A) a polymer substrate printed or coated with the ink composition,
(i) wherein the polymer substrate (before printing or coating) has a) degraded quality, b) inconsistent surface treatments, c) areas wherein surface energy is equal to or less than optimal surface energy, and d) wherein when the polymer substrate is made from polypropylene (PP) film it has areas wherein the surface energy is equal to or less than about 36 dynes/cm, and when the polymer substrate is made from polyester (PE) film it has areas wherein the surface energy is equal to or less than about 52 dynes/cm, and the polymer substrate (after printing or coating) has improved adhesion of the ink composition; and
(ii) wherein the ink composition comprises adhesion promoting composition consisting of:
(a) are organotitanate adhesion promoter; and
(b) at least one surface active agent; and
(c) optionally comprises at least one solvent, wherein the surface active agent comprises a compound selected from the group comprising a surfactant and a polymeric surfactant; and wherein the organotitanate adhesion promoter comprises:
a. organotitanium beta-diketonates comprising a reaction product of a titanium orthoesters and beta-diketone;
b. organotitanium alkyl phosphates comprising a reaction product of a titanium orthoester and at least a monoalkyl phosphate;
c. organotitanium alkyl sulfonates comprising a reaction product of a titanium orthoester and a sulfonic acid or a derivative of sulfonic acid;
d. reaction product composition of titanium orthoesters, alkyl phosphates and resins; or
e. a mixture thereof; and wherein the surface active agent is selected from:
i) a surfactant comprising 2-propenoic acid, 2-[methyl [(nonafluorobutyl)sulfonyl]amino]ethyl ester, 2-methoxymethylethoxypropanol, and polyether polymer;
ii) ethoxylated 2,4,7,9-tetramethyl-5-decyn-4,7-diol surfactant;
iii) a surfactant comprising ethoxylated 2,4,7,9-tetramethyl-5-decyne-4,7-diol and 2,4,7,9-tetramethyl-5-decyne-4,7-diol;
iv) ethoxylated 2,4,7,9-tetramethyl-5-decyn-4,7-diol surfactant or POE (3.5) tetramethyldecynediol surfactant;
v) 2,5,8,11-tetramethyl-6-dodecyn-5,8-diol ethoxylate surfactant; and
vi) 2-{[2-hydroxy-3-(octyloxy)propyl]sulfanyl}ethan-1-ol surfactant.

5. The substrate as claimed in claim 4, wherein the polypropylene (PP) film substrate has areas wherein surface energy varies from about 30 to about 36 dynes/cm, or from about 33 to about 36 dynes/cm.

6. The substrate as claimed in claim 4, wherein the polyester (PE) film substrate has areas wherein surface energy varies from about 48 to about 52 dynes/cm, or from about 50 to about 52 dynes/cm.

7. The substrate as claimed in claim 4, wherein the solvent is selected from the group comprising alkyl alcohols and esters for the ink composition.

8. The substrate as claimed in claim 4, wherein the solvent comprises ethanol, 1-propanol, 2-propanol, ethyl acetate or n-propyl acetate.

* * * * *

UNITED STATES PATENT AND TRADEMARK OFFICE
CERTIFICATE OF CORRECTION

PATENT NO. : 10,316,203 B2  
APPLICATION NO. : 15/325372  
DATED : June 11, 2019  
INVENTOR(S) : Mahesh Subramaniyam and Michael Michalczyk Page 1 of 1

It is certified that error appears in the above-identified patent and that said Letters Patent is hereby corrected as shown below:

In the Claims

Claim 4, Column 15, Line 47, replace "are" with --an--

Signed and Sealed this
Twenty-seventh Day of August, 2019

Andrei Iancu
*Director of the United States Patent and Trademark Office*